July 25, 1950     H. M. UNSCHULD     2,516,733
SOYBEAN OIL REFINING PROCESS
Filed Dec. 5, 1947     3 Sheets-Sheet 1
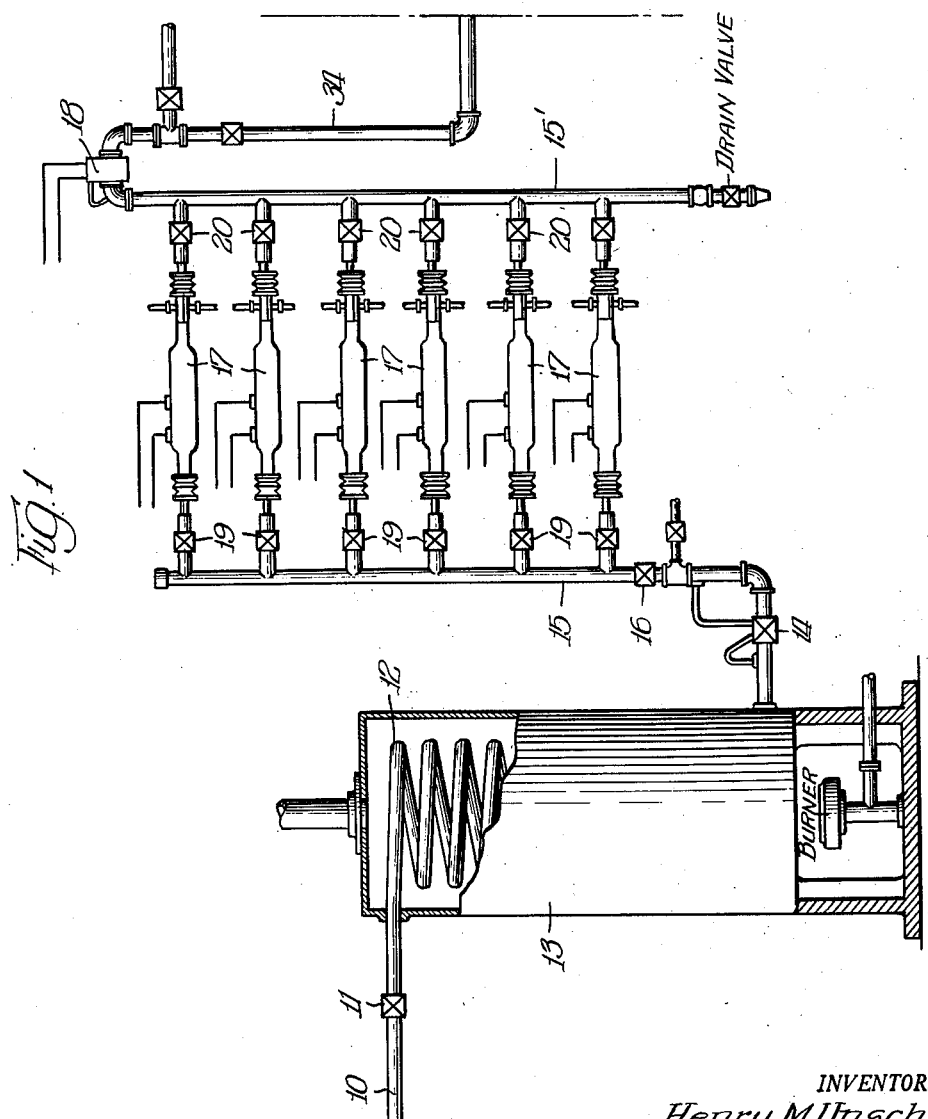
INVENTOR.
Henry M. Unschuld,
BY

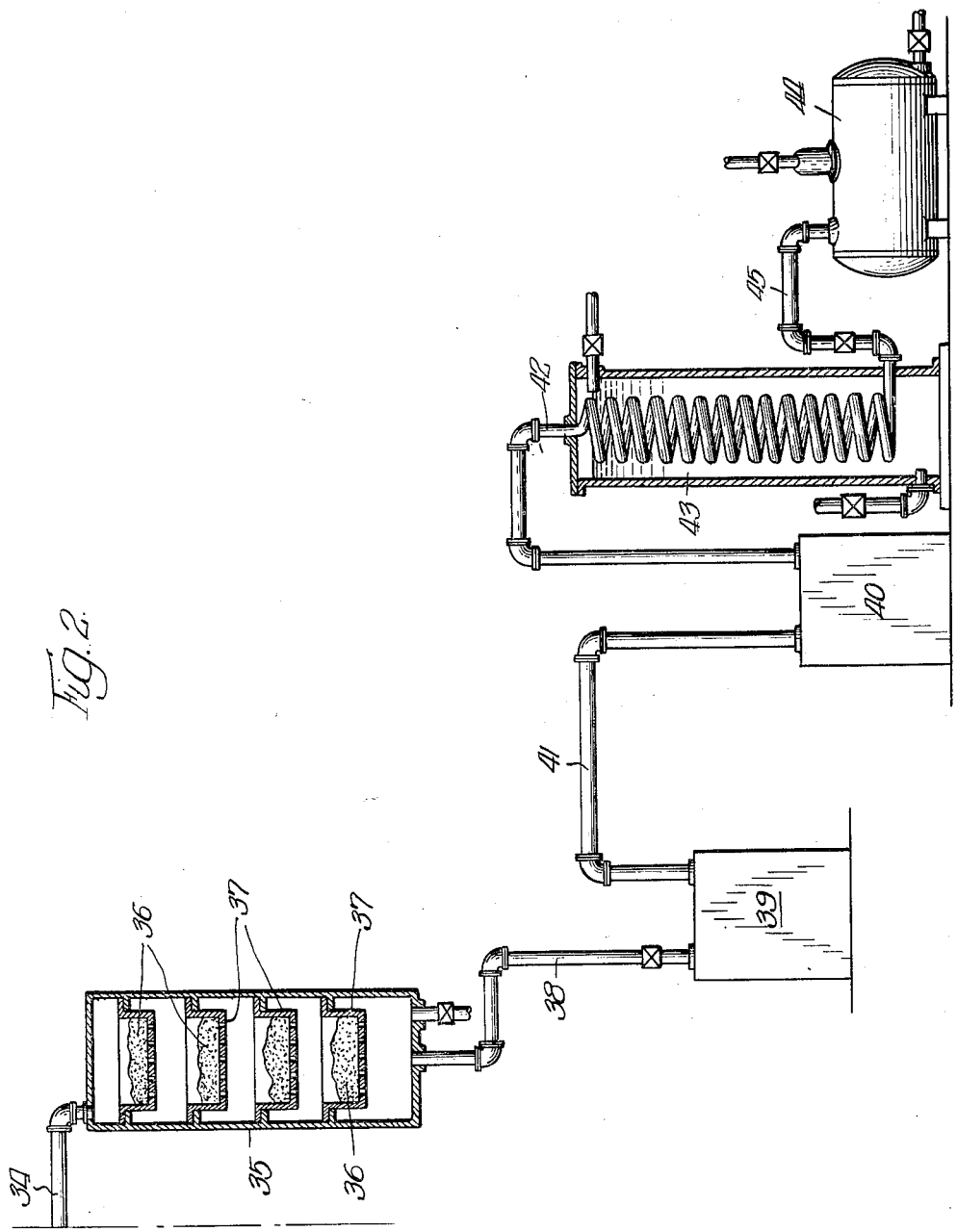

July 25, 1950     H. M. UNSCHULD     2,516,733
SOYBEAN OIL REFINING PROCESS
Filed Dec. 5, 1947     3 Sheets-Sheet 3
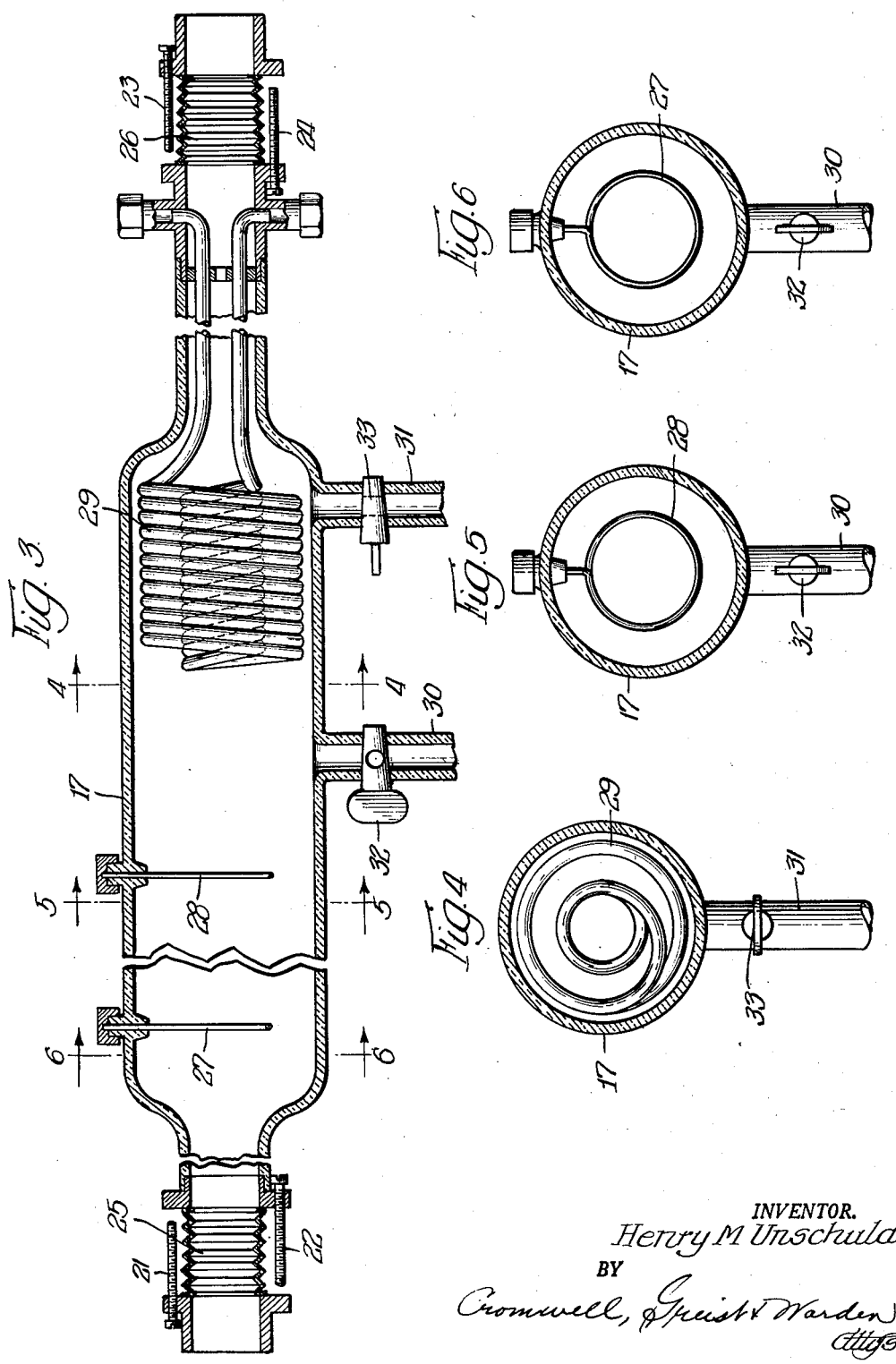
INVENTOR.
Henry M Unschuld,
BY
Cromwell, Greist & Warden
Attys.

Patented July 25, 1950

2,516,733

UNITED STATES PATENT OFFICE 2,516,733

SOYBEAN OIL REFINING PROCESS

Henry M. Unschuld, Chicago, Ill.

Application December 5, 1947, Serial No. 789,859

1 Claim. (Cl. 204—186)

The present invention has to do with the refining of oils. More particularly, it pertains to the refining of vegetable oils, especially soybean oil, in such a manner that phosphatides and, in particular, lecithin and fatty acids, are removed therefrom together with other products, by a novel chemo-electrical process, whereby a purified, deodorized, and decolorized oil is obtained, and one which is free of reversion and rancidity characteristics.

Crude soybean has been an article of commerce for many years, most of which, up until the last decade, has been imported in a so-called "refined" state. However, the resulting purified oil always very quickly acquires different disagreeable odors and flavors which have been described as "grassy," "painty," and even "fishy." Such oils could not be used for edible purposes but were confined in their use to industrial purposes merely. Many attempts to refine the oil to make it useful for edible purposes have been attempted but these have proven to be costly and not altogether satisfactory. Various chemical procedures using hexane solvents, hydrogenation processes, and the like have been used with some measure of success. However, while the oil when first treated may have appeared sweet and bland, it soon developed that the rancidity and, in particular, the reversion characteristics, returned, and the oil, when subjected to high degrees of heat during cooking, and the like, or to low degrees of heat, for example, when placed on the shelf until required for use, caused the oil to decolorize and become malodorous. In addition to this, the refining processes often destroyed valuable constituents of the oil, such as phosphatides, lecithins, vitamins, and the like, so that a great deal of waste of material has occurred and this has proved very costly to industry generally.

There has been speculation among edible oil and fat technologists concerning the cause of reversion, decolorization, etc., but apparently it has become the generally accepted theory that such disadvantageous characteristics present remaining in the oil, even after moderate methods of refining, are due to some undesirable constituent not entirely removed in refining and the most frequently mentioned of such bodies are the phospholipids or phosphatides. The chief phosphatides are lecithin, cephalin, sphingomyelin. Other constituents of the phosphatids are simple fats and waxes, cerebrosides, fatty acids, including other color bodies remaining in the oil after refining which, when subjected to the action of heat and chemicals, become wholly or partially destroyed to such an extent that, when not removed from the oil, cause the return of harmful constituents as above mentioned.

It would be a distinct advantage to overcome the foregoing difficulties by refining the oil in such a manner that phosphatides, and especially lecithin and fatty acids, can be removed therefrom in such a manner that they are not appreciably impaired for future use but are maintained in a relatively purse state, and, likewise, to maintain whatever phosphatides remain in the oil in a similar natural and pure condition so that the ultimately refined oil will be, and remain, decolorized and deodorized, and this is accomplished by means of the present invention.

A principal object of the invention is to provide a process for refining vegetable oil by heating the same at subatmospheric pressure to increase the molecular activity to such an extent that the phosphatides exhibit sufficient molecular disruption to prepare them for electrical bombardment by means of an electric current between spaced apart electrodes, then electrically bombarding the same so as to shock the phosphatides, and immediately chilling the oil so that the phosphatides will remain in that condition without reacting with the oil and so that they will precipitate from the cooled oil, and then separately recovering the phosphatides and, in particular, lecithin, as well as a vegetable oil which permanently maintains its decolorization and deodorization characteristics which appear immediately after the removal of the phosphatides and lecithin therefrom.

More specifically, it is an object of the invention to provide a process for refining soybean oil by heating the same in excess of 100° F. and removing phosphatides, lecithin, and fatty acids therefrom by subjecting the heated oil to the action of an electric current passing between spaced apart electrodes so that the heated oil is bombarded by the current operating on a specified voltage, frequency and amperage for a period of time which will main the phosphatides in their disintegrated position with respect to the rest of the oil, and then immediately thereafter subjecting the oil bearing the disintegrated phosphatides to a cold or chilling temperature or zone so that they cannot react or reform to their original condition, and separating the phosphatides from the oil and obtaining a purified oil.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claim.

For a fuller understanding of the nature and objects of the invention reference should be had to the following detailed description taken in connection with the accompanying drawings, in which:

Fig. 1 is a diagrammatic illustration of a portion of an apparatus suitable for practicing the invention setting forth means by which the oil is heated to a suitable temperature, passed into a header carrying one or more tubes, wherein the heated oil is subjected to the action of an electric current to separate the phosphatides and other materials from the oil after the same has been chilled in a cold zone;

Fig. 2 is a continuation of the apparatus depicted in Fig. 1 wherein the oil, after having had the phosphatides and other materials removed therefrom, is passed through a filter and then through a vacuum pump and filter press and subjected to further cooling action of a cooling coil and recovered as purified decolorized and deodorized vegetable oil;

Fig. 3 is a sectional view of one of the tubes shown in Fig. 1 wherein the heated oil is subjected to an electrical bombardment between spaced apart electrodes and cooled to separate the phosphatides and other materials in the oil;

Fig. 4 is a sectional view, taken along the lines 4—4 of Fig. 3 and looking in the direction of the arrows;

Fig. 5 is a sectional view, taken along the lines 5—5 of Fig. 3 and looking in the direction of the arrows; and Fig. 6 is a sectional view, taken along the lines 6—6 of Fig. 3 and looking in the direction of the arrows.

Preferably, the invention specifically refers to the refining of soybean oil but it should be understood that the invention can be practiced in connection with any suitable vegetable oil including castor oil, rapeseed oil, cottonseed oil, palm oil, peanut oil, sesame oil, coconut oil, copra oil, olive oil, tea oil, sunflower oil, poppyseed oil, linseed oil, and corn oil, and the like, and, in fact, any oil comparable to soybean oil containing phosphates, or other materials, such as, for example, fish oil which it may be desired to remove from the oil and recover as such.

Referring more particularly to the drawings, charging stock, from any suitable source, is first passed through a pipe line 10, a valve 11, and into a coil 12 shown in a housing 13. A vacuum is maintained in the line by suitable means and the coil 12 is filled with a charge of oil and held in check by an automatic valve 14.

The oil is heated at least above 100° F. by the burner below the coil 12. Any suitable degree of heat may be chosen anywhere from 100° F. to 520° F. depending on the treatment of the oil which is to follow or the type of oil which it is intended to treat.

When the oil has been sufficiently heated, the automatic valve 14 opens and the oil is released into the header 15 by an automatic needle valve 16. The oil is then charged into the tubes 17 of which there may be one or a plurality as desired. The tubes are connected between the header 15 on one side and the header 15' on another side.

Hand valves 19 and 20 on opposite ends of the tubes enable one or more of them to be by-passed for convenient operation.

Referring now to Figs. 3, 4, 5 and 6 one of my specially designed tubes is disclosed in detail. It comprises an elongated tubular arrangement of quartz construction and is secured between the valves 19 and 20 by means of bolts 21 and 22 at one end and bolts 23 and 24 at the other end. However, to absorb any expansion or shock there is provided between the ends of the tubes and the valves, or the nipples to which the valves are attached, an expansion joint 25 and 26 respectively at each end of the tube.

Approximately in the center of the tube are two spaced apart ring shaped platinum electrodes 27 and 28. One of these may be made of tungsten, if desired. These are connected to a convenient source of electric current capable of carrying a voltage of at least between 500 to 10,000, at a frequency of at least from 500 to 30,000 cycles and at a rate of less than one ampere preferably in the neighborhood of 100 to 700 milliamperes when practicing the present invention. Such electrical shock treatment is of an extremely short duration of from 0.05 second to 60 seconds. Electrical timers capable of establishing such instantaneous electrical current are readily available on the market and need no special description here. Within one end of the tube as viewed to the right of the drawing is a cooling coil 29 capable of continuously cooling the tube to a temperature of from 32° F. to —64° F. At the bottom of each tube appears two drainage ports 30 and 31 having valves 32 and 33.

In operation up to this point the heated oil entering the tubes 17 from the header 15 is in a condition of molecular activity wherein the phosphatides are separated to such an extent that they are in condition to be removed from the heated oil. As the oil passes between the electrodes 27 and 28 they are subjected to the electrical bombardment because of the current passing between the electrodes. This must be accomplished by a critical selection of the voltage, frequency, and amperage of the current for a selected length of time in order to shock the phosphatides or other materials which are selected for removal. This electrical bombarding action prevents the immediate rearrangement or reaction of the separated molecular structures of the phosphatides or other materials and, as the oil and these constituents continue to pass beyond the electrodes, they are permanently prevented from reacting by immediately being chilled or subjected to the cold zone provided by the cooling coil 29.

Specific examples of treatment of the oil are set forth hereinafter. At this point suffice it to say that after the oil has been heated as above described, it enters the header 15 upon the opening of the automatic valve 18. Thereupon the oil is electrically bombarded and phosphatides and other materials which have been separated pass through the valve 18 and into line 34.

Referring now to Fig. 2 of the drawings there is shown the rest of the apparatus which is connected to the apparatus of Fig. 1, whereby the recovery of the purified oil is completed. The oil passes into a jacket 35 having a series of suitable filter materials 36 held in perforated trays 37 to recover phosphatides, lecithin, fatty acids and any other materials which it is desired to remove from the oil in that area.

After the oil has been filtered it passes through line 38 into and through the vacuum pump 39 and then into a final filter press 40 through line 41. The oil is then further cooled by passing through a coil 42 in a liquid bath 43 and recovered in a tank 44 through line 45. This oil has the desired characteristics in that it is now permanently deodorized and decolorized and will remain bland and sweet for extended periods of time. It does not exhibit reversion or rancidity characteristics as established by samples obtained from the examples set forth as follows:

Example 1

Soybean oil was heated to 320° F. and passed into the quartz tubes, subjected to a voltage of between 500 to 10,000, at a frequency of 500 to 30,000 cycles at a milliamperage of 300 to 500 for 0.05 to 0.09 second and then subjected to a cold zone between 32° F. to —64° F. under vacuum. (Preferably the vacuum in the line is about 28 to 29.5 millimeters of mercury.) Thereafter, the oil was filtered to remove phosphatides, lecithin, fatty acids and other materials, the oil was then cooled and recovered.

Example 2

The process was repeated with sardine oil similarly heated but subjected to a voltage of 600 to 6000, a frequency of 1200 to 5000 cycles and a milliamperage of 500 for a period of time of about 0.5 second. The oil was also subjected to a cold zone of between 32° F. to —64° F. under vacuum.

Example 3

A similar heat range as in the preceding examples was maintained in heating peanut oil. The voltage was maintained between 500 to 15,000 volts operating at a frequency of 2000 cycles and a time of 0.05 second at less than one ampere and the oil was similarly subjected to a cold zone of between 32° F. to —64° F.

Example 4

Soybean oil was heated to about 520° F. and subjected to a voltage of 500 to 2000, a frequency of 500 to 4000 cycles, a milliamperage of 100 to 700 for a period of time from 30 to 60 seconds. Thereafter, the oil was filtered to remove phosphatides, lecithin, fatty acids and other materials, the oil was then cooled and recovered.

All of the above mentioned oils were purified and remained clear in color and free from odor for a period of time of about seven months until the filing of this application and have remained so. The lecithin and other phosphatides removed from the oil was recovered in a substantially pure state.

It will be understood that the invention contemplates a procedure wherein the oil can be processed continuously, or continuously-intermittently. That is to say, the oil can continuously be passed through the system under vacuum, or it can be held in check in the tubes momentarily until treated and then passed through the system.

It will thus be seen that the objects hereinbefore set forth may readily and efficiently be attained, and since certain changes may be made in carrying out the above process without departing from the scope of the invention, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

I claim:

A process for refining soybean oil, which comprises heating said oil at subatmospheric pressure at a temperature of 100° F. to 520° F., separating lecithin, phosphatides, and fatty acids from said oil by passing an electric current through spaced electrodes immersed in the oil, said current operating within a voltage range of about 500 to 2000, a frequency of about 500 to 4000 cycles at 100 to 700 milliamperes for a period of time falling within a range of 30 to 60 seconds and recovering said lecithin and other phosphatides leaving a deodorized and decolorized soybean oil remaining.

HENRY M. UNSCHULD.

REFERENCES CITED

The following references are of record in the file of this patent:

UNITED STATES PATENTS

| Number | Name | Date |
|---|---|---|
| 1,377,021 | Mumford | May 3, 1921 |
| 2,170,665 | Russell | Aug. 22, 1939 |
| 2,175,619 | Ruhl | Oct. 10, 1939 |